US008468584B1

(12) United States Patent  
Hansen

(10) Patent No.: US 8,468,584 B1
(45) Date of Patent: Jun. 18, 2013

(54) AUTHENTICATION CODE WITH ASSOCIATED CONFIRMATION WORDS

(75) Inventor: Stanton W. Hansen, Holladay, UT (US)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

(21) Appl. No.: 13/079,656

(22) Filed: Apr. 4, 2011
(Under 37 CFR 1.47)

Related U.S. Application Data

(60) Provisional application No. 61/320,533, filed on Apr. 2, 2010.

(51) Int. Cl.
| G06F 7/04 | (2006.01) |
| G06F 15/16 | (2006.01) |
| G06F 17/30 | (2006.01) |
| G06L 29/06 | (2006.01) |
| G06Q 40/00 | (2012.01) |
| H04M 1/66 | (2006.01) |
| H04M 1/68 | (2006.01) |
| H04M 3/16 | (2006.01) |

(52) U.S. Cl.
USPC .......... 726/7; 705/39; 705/44; 713/169; 455/411

(58) Field of Classification Search
USPC .............................................. 726/7; 705/44
See application file for complete search history.

(56) References Cited

U.S. PATENT DOCUMENTS

| 6,012,144 A * | 1/2000 | Pickett .................................. 726/26 |
| 6,397,198 B1 * | 5/2002 | Hoffman et al. ................ 705/44 |
| 6,934,858 B2 * | 8/2005 | Woodhill ........................... 726/5 |
| 6,973,168 B2 * | 12/2005 | Charlet et al. ................ 379/88.02 |
| 7,715,823 B2 * | 5/2010 | Bravo et al. ................... 455/411 |
| 2005/0268107 A1 * | 12/2005 | Harris et al. ................... 713/182 |
| 2007/0136573 A1 * | 6/2007 | Steinberg ....................... 713/155 |
| 2008/0052226 A1 * | 2/2008 | Agarwal et al. ................ 705/39 |
| 2008/0141353 A1 * | 6/2008 | Brown ............................ 726/7 |
| 2009/0117879 A1 * | 5/2009 | Pawar et al. ................. 455/412.1 |
| 2010/0313253 A1 * | 12/2010 | Reiss .............................. 726/7 |
| 2011/0047605 A1 * | 2/2011 | Sontag et al. .................. 726/7 |
| 2011/0213706 A1 * | 9/2011 | Joshi et al. .................... 705/44 |
| 2012/0066749 A1 * | 3/2012 | Taugbol et al. ................ 726/6 |

OTHER PUBLICATIONS

Authentication in an Internet Banking Environment Federal Financial Institutions Examination Council 2005 (for evidence of the date given, see http://www.fdic.govinews/news/financial/2011/fil11050.html).*
Code talker From Wikipedia, the free encyclopedia Appears as crawled by the Wayback Machine on Feb. 10, 2010.*

(Continued)

*Primary Examiner* — Nathan Flynn
*Assistant Examiner* — Vadim Savenkov
(74) *Attorney, Agent, or Firm* — Merchant & Gould P.C.

(57) ABSTRACT

An initiating user receives an authentication code and an associated confirmation word from a server system in response to an authentication code request. The initiating user initiates a communication session with an authenticating user and provides the authentication code to the authenticating user without providing the associated confirmation word to the authenticating user. The authenticating user is only able to obtain the associated confirmation word if the authentication code corresponds to an authentication code previously generated by the server system for the initiating user and no usage limitation on the authentication code has been reached. Subsequently, the initiating user receives a confirmation word from the authenticating user. The initiating user provides action instructions to the authenticating user when the confirmation word provided by the authenticating user corresponds to the associated confirmation word.

24 Claims, 8 Drawing Sheets

OTHER PUBLICATIONS

Secure Authentication on the Internet SANS Institute Reading Room Roger Meyer Apr. 4, 2007.*

Multifactor Authentication Security Now! Copyright © 2006 by Steve Gibson and Leo Laporte.*

* cited by examiner

AUTHENTICATION CODE WITH ASSOCIATED CONFIRMATION WORDS

This application claims the benefit of U.S. Provisional Application No. 61/320,533, filed Apr. 2, 2010, the entire content of which is hereby incorporated by reference.

BACKGROUND

A first employee of an enterprise may need to instruct a second employee of the enterprise to perform some action when the first employee is away from his or her office. For example, a banker may need to instruct a clerk to transfer money between a client's bank accounts when the banker is at a meeting with the client. To send instructions to perform an action, the first employee typically makes a telephone call to the second employee and asks the second employee to perform the action. If the enterprise is sufficiently large, the second employee might not recognize the voice of the first employee. Consequently, the second employee might not be certain whether he or she should perform the action requested by the first employee. In other words, the second employee is not sure whether the first employee is allowed to perform the action or whether someone is attempting to commit fraud.

To overcome this issue, the enterprise can generate a different authentication code each day. The enterprise then distributes the authentication code of the day to each employee who is authorized to perform the action. When the first employee calls a second employee to request the second employee to perform the action, the second employee asks the first employee to provide the authentication code of the day. If the first employee is unable to provide the authentication code of the day, the second employee refuses to perform the action requested by the first employee. If the first employee is able to provide the authentication code of the day, the second employee performs the action requested by the first employee.

Using an authentication code of the day presents several drawbacks. For example, nothing prevents the second user from writing down the authentication code of the day and fraudulently using the authentication code of the day. In another example, the first user has no assurance that the second user actually performed the action. In yet another example, the second user has no assurance that the first user has received the authentication code of the day in a legitimate manner.

SUMMARY

This summary is provided to introduce a selection of concepts. These concepts are further described below in the Detailed Description. This summary is not intended to identify key features or essential features of the claimed subject matter, nor is this summary intended as an aid in determining the scope of the claimed subject matter.

One aspect is a method for determining whether to provide action instructions. The method comprises sending, by an initiating user, an authentication code request to a server system. The method also comprises receiving, by the initiating user, an authentication code and a first confirmation word from the server system in response to the authentication code request. The first confirmation word is associated with the authentication code. The method also comprises using, by the initiating user, a communication device to initiate a communication session with an authenticating user. In addition, the method comprises providing, by the initiating user, the authentication code to the authenticating user without providing the first confirmation word to the authenticating user. The authenticating user has no access to the first confirmation word when a usage limitation on the authentication code has been reached. Furthermore, the method comprises receiving, by the initiating user, a second confirmation word from the authenticating user after providing the authentication code to the authenticating user. The method also comprises after receiving the second confirmation word, providing, by the initiating user, action instructions to the authenticating user when the second confirmation word corresponds to the first confirmation word. The action instructions request performance of an action.

Another aspect is a method for determining whether to perform requested actions. The method comprises accepting, by an authenticating user, an invitation to join a communication session with an initiating user. The method also comprises receiving, by the authenticating user, an authentication code from the initiating user without receiving an associated confirmation word from the initiating user. Furthermore, the method comprises sending, by the authenticating user, the authentication code to a server system. In addition, the method comprises receiving, by the authenticating user, the associated confirmation word from the server system when the authentication code corresponds to a previously-generated authentication code and no usage limitation on the authentication code has been reached. The method also comprises providing, by the authenticating user, the associated confirmation word to the initiating user after receiving the associated confirmation word from the server system. In addition, the method comprises performing an action requested by the initiating user when the authentication code corresponds to the previously-generated authentication code and no usage limitation on the authentication code has been reached. Furthermore, the method comprises refusing, by the authenticating user, to perform the action requested by the initiating user when the authentication code does not correspond to the previously-generated authentication code or a usage limitation on the authentication code has been reached.

In yet another aspect, a computing system comprises a data storage system that stores instructions. The computing system also comprises a processing system that executes the instructions. Execution of the instructions by the processing system causing the computing system to initiate a communication session with an authenticating user. Execution of the instructions also causes the computing system to send audio data representing an authentication code to an authenticator device of the authenticating user via the communication session without providing a first confirmation word to the authenticating user. The authenticating user has no access to the first confirmation word when a usage limitation on the authentication code has been reached. In addition, execution of the instructions causes the computing system to receive audio data representing a second confirmation word from the authenticator device. After receiving the audio data representing the second confirmation word, execution of the instructions causes the computing system to send audio data representing action instructions to the authenticator device via the communication session when the second confirmation word corresponds to the first confirmation word, wherein the action instructions request performance of an action.

In yet another aspect, a server system comprises a data storage system that stores instructions. The server system also comprises a processing system that executes the instructions. Execution of the instructions by the processing system causing the processing system to generate a first authentication code in response to an authentication code request received from a first device. The first device is associated with a first user. Execution of the instructions also causes the server system to receive a validation request from a second device. The second device is associated with a second user. The validation request specifies a second authentication code. In addition, execution of the instructions causes the server system to determine, after receiving the validation request, whether the second authentication code corresponds to the first authentication code. Furthermore, execution of the instructions causes the server system to determine whether a usage limitation on the first authentication code has been reached. In addition, after determining that the second authentication code corresponds to the first authentication code and after determining that the usage limitation on the first authentication code has not been reached, execution of the instructions causes the server system to send an associated confirmation word to the second device. The server system does not send the associated confirmation word to the second device after determining that the second authentication code does not correspond to the first authentication code or after determining that the usage limitation on the first authentication code has been reached.

In yet another aspect, a system comprises a communication device associated with an initiating user. The communication device comprises a first data storage system. The first data storage system comprises a first set of instructions. The communication device also comprises a first processing system. The first processing system executes the first set of instructions. In addition, the system comprises an authenticator device associated with an authenticating user. The authenticator device comprises a second data storage system. The second data storage system comprises a second set of instructions. The authenticator device comprises a second processing system. The second processing system executes the second set of instructions. The system also comprises a server system that comprises a third data storage system. The third data storage system comprises a third set of instructions. The server system also comprises a third processing system. The third processing system executes the third set of instructions. Execution of the first set of instructions by the first processing system causes the communication device to send an authentication code request to the server system. Execution of the third set of instructions by the third processing system causes the server system to send an authentication code and an associated confirmation word to the initiating user in response to the authentication code request. Execution of the first set of instructions causes the communication device to communicate with the authenticator device to establish a voice telephony session between the initiating user and the authenticating user. The initiating user uses the voice telephony session to provide the authentication code but not the associated confirmation word to the authenticating user. Execution of the second set of instructions causes the authenticator device to send the authentication code to the server system. Execution of the third set of instructions causes the server system to determine, in response to receiving the authentication code, whether the authentication code received from the authenticating user corresponds to the authentication code sent to the initiating user. When the authentication code received from the authenticating user corresponds to the authentication code sent to the initiating user, execution of the third set of instructions causes the server system to determine whether a usage limitation of the authentication code has been reached. When no usage limitation of the authentication code has been reached, execution of the third set of instructions causes the server system to send the associated confirmation word to the authenticating user. If the authenticating user receives the associated confirmation word from the server system, the authenticating user provides the associated confirmation word to the initiating user via the voice telephony session. If the authenticating user does not receive the associated confirmation word from the server system, the authenticating user refuses to perform an action requested by the initiating user.

DETAILED DESCRIPTION

Figure 1:
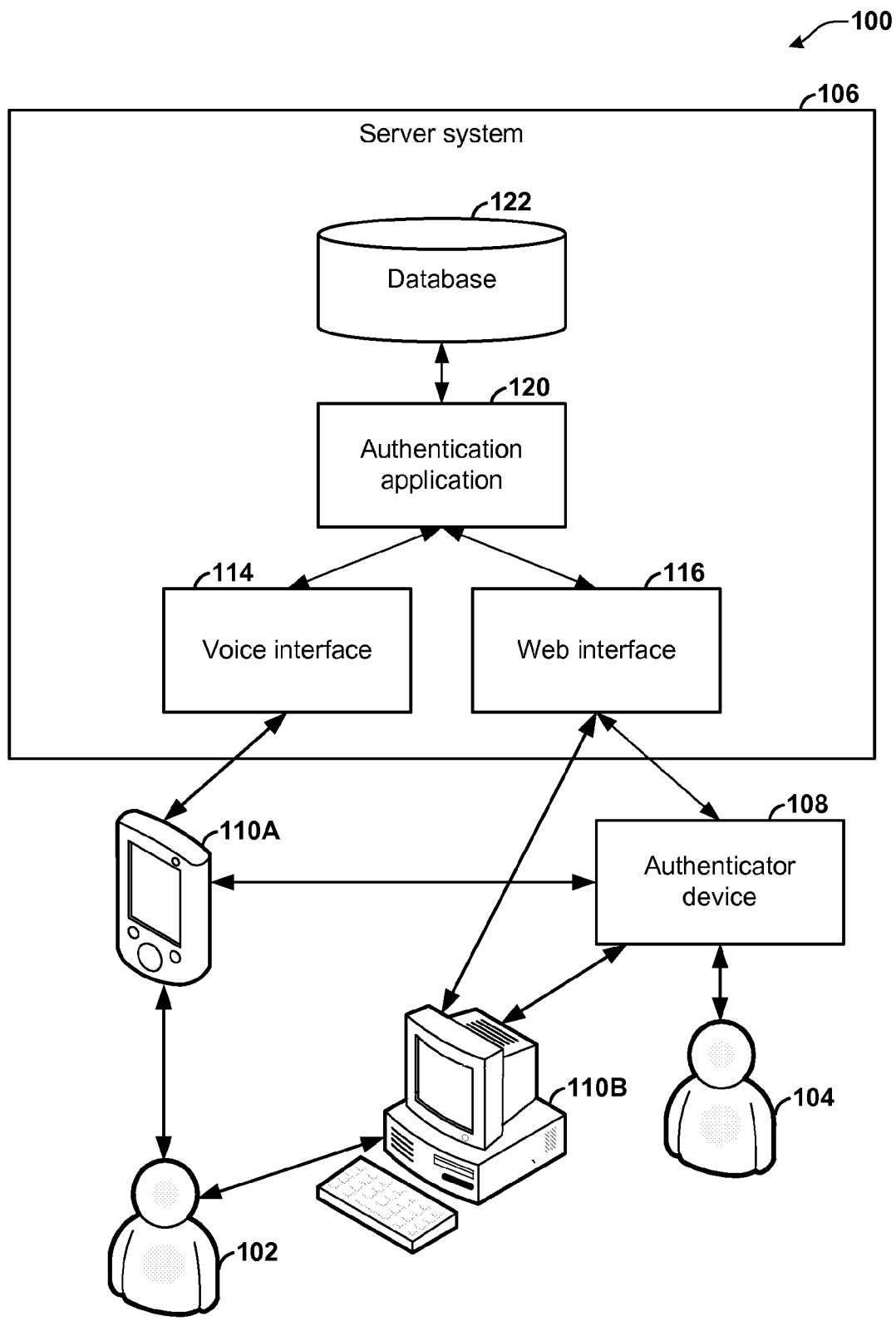
FIG. 1 illustrates an example system for authenticating an initiating user.

FIG. 1 illustrates an example system 100 for authenticating an initiating user 102. It should be appreciated that FIG. 1 and all of the other figures merely provide examples. Other embodiments can include more, fewer, or different devices, users, systems, steps, and so on.

As illustrated in the example of FIG. 1, the system 100 includes the initiating user 102 and an authenticating user 104. The initiating user 102 and the authenticating user 104 are individual human beings. The initiating user 102 wants an action to be performed. For example, the initiating user 102 may want to transfer money from one bank account to another bank account. The initiating user 102 communicates with the authenticating user 104 to request performance of the action. Prior taking steps toward completion of the action, the authenticating user 104 needs to authenticate the identity of the initiating user 102. In other words, the authenticating user 104 needs to verify that the initiating user 102 is who the initiating user 102 says he or she is.

The system 100 includes a server system 106, an authenticator device 108, and communication devices 110A and 110B (collectively, "communication devices 110"). The server system 106, the authenticator device 108, and the communication devices 110 operate to enable the authenticating user 104 to authenticate the identity of the initiating user 102.

The authenticator device 108 and the communication devices 110 are communication devices. Communication devices encompass tangible, physical devices that enable users to communicate with other users. In various embodiments, the authenticator device 108 and the communication devices 110 are various types of communication devices. For example, the authenticator device 108 and the communication devices 110 can be personal computers, laptop computers, handheld computers, smart phones, mobile telephones, landline telephones, network telephones, tablet computers, thin client computers, mainframe computers, video game consoles, portable gaming devices, computing devices integrated into vehicles, television set top boxes, and other types of devices that enable users to communicate with other users.

In the example of FIG. 1, the communication device 110A is a smart phone and the communication device 110B is a personal computer. Other embodiments do not necessarily include a smart phone and a personal computer. Rather, the communication device 110A is a smart phone and the communication device 110B is a personal computer in the example of FIG. 1 to illustrate that the initiating user 102 can use different types of communication devices to communicate with the server system 106 and the authenticator device 108.

The server system 106 is a system comprising one or more computing devices. Computing devices encompass tangible, physical devices that process data. Some computing devices are communication devices. In various embodiments, the server system 106 includes various types of computing devices. For example, the server system 106 can include one or more personal computers, mainframe computers, standalone server devices, blade server devices, load balancer devices, firewall devices, intrusion detection devices, routers, switches, and other types of devices that process data.

Computing devices comprise processing systems and data storage systems. A processing system is a system of one or more processing units. Processing units include integrated circuits that are able to execute computer-readable instructions. A data storage system is a system of one or more computer-readable data storage media. A computer-readable data storage medium includes a non-transient physical device or article of manufacture that is capable of storing data and computer-readable instructions in a way that is readable by a computing device. Operations ascribed to computing devices and systems of computing devices, such as the authenticator device 108, the communication devices 110, and the server system 106, are performed by the computing devices and systems of computing devices when the processing systems of the computing devices execute the instructions stored on the data storage systems of the computing devices. Thus, by reading and executing instructions, the computing devices are transformed from generic computing devices into computing devices having particular functions.

Although not illustrated in the example of FIG. 1 for the sake of simplicity, one or more communication networks facilitate communication among the server system 106, the authenticator device 108, and the communication devices 110. A communication network is a system of computing devices and links that facilitate communication between computing devices. Such networks can include local area networks, wide area networks (such as the Internet), wired and/or wireless telephone networks, and other types of communication networks.

In the example of FIG. 1, the server system 106 comprises a voice interface 114, a web interface 116, an authentication application 120, and a database 122. The voice interface 114 enables the initiating user 102 to use voice communication to communicate with the authentication application 120. The web interface 116 enables the initiating user 102 and the authenticating user 104 to use web communication to communicate with the authentication application 120 via web communication. Web communication is communication using a communication protocol built on or part of the World Wide Web communication protocol stack. The authentication application 120 provides authentication codes and confirmation words to the initiating user 102 and enables the authenticating user 104 to validate authentication codes. The authentication application 120 stores database records in the database 122. The database records are data structures that contain information regarding authentication codes. This document discusses the voice interface 114, the web interface 116, the authentication application 120, and the database 122 in detail with regard to other figures.

The initiating user 102 uses either of the communication devices 110 to send an authentication code request to the server system 106. In response to the authentication code request, the initiating user 102 receives an authentication code and an associated confirmation word from the authentication application 120. An authentication code is a sequence of one or more characters, such as letters, symbols, and/or numbers. For example, "arx6714" can be an authentication code. A confirmation word is a sequence of one or more words. For example, "rainbows" can be a conformation word.

After obtaining the authentication code and the associated confirmation word, the initiating user 102 invites the authenticating user 104 to participate in a communication session. For example, the initiating user 102 can invite the authenticating user 104 to participate in a voice telephony session, an instant messaging session, or another type of interactive communication session. The authenticating user 104 uses the authenticator device 108 to begin participating in the communication session. After the authenticating user 104 begins participating in the communication session, the initiating user 102 provides the authentication code to the authenticating user 104, but does not provide the associated confirmation word to the authenticating user 104.

The authenticating user 104 then uses the authenticator device 108 to communicate with the authentication application 120 to validate the authentication code. The authentication code is validated when the server system 106 has previously generated the authentication code in response to an authentication code request from the initiating user 102 and no usage limitation on the authentication code has been reached. A usage limitation is a limitation on how an authentication code can be used. In some embodiments, the authenticating user 104 uses two separate communication devices to communicate with the initiating user 102 and to communicate with the authentication application 120. Hence, the authenticating user 104 has no access to the confirmation word when a usage limitation on the authentication code has been reached.

If the authentication application 120 successfully validates the authentication code, the authentication application 120 notifies the authenticating user 104 and provides the associated confirmation word to the authenticating user 104. The authentication application 120 does not provide the associated confirmation word to the authenticating user 104 if the authentication code is not successfully validated. Consequently, the authenticating user 104 is only able to obtain the associated confirmation word if the authentication code corresponds to an authentication code previously generated by the server system 106 in response to an authentication code request from the initiating user 102 and no usage limitations on the authentication code has been reached. In various embodiments, a first authentication code can correspond to a second authentication code in various ways. For example, the first authentication code can correspond to a second authentication code when the first authentication code corresponds to the second authentication code.

If the authenticating user 104 receives the associated confirmation word, the authenticating user 104 provides the associated confirmation word to the initiating user 102. If the confirmation word provided by the authenticating user 104 corresponds to the confirmation word provided to the initiating user 102 by the authentication application 120, the initiating user 102 has assurance that the authenticating user 104 actually used the authentication code. In various embodiments, a first confirmation word can correspond to a second confirmation word in various ways. For example, the first confirmation word can correspond to a second confirmation word when the first confirmation word corresponds to the second confirmation word. In another example, the first confirmation word can correspond to a second confirmation word when the second confirmation word provides a dictionary definition of the first confirmation word.

In addition, if the confirmation word provided by the authenticating user 104 corresponds to the confirmation word provided to the initiating user 102 by the authentication application 120 and the authentication code can only be used one time, the initiating user 102 knows that the authentication code cannot be used again. If the confirmation word provided by the authenticating user 104 corresponds to the confirmation word provided by the authentication application 120, the initiating user 102 can then instruct the authenticating user 104 to perform some action. For instance, the initiating user 102 can instruct the authenticating user 104 to transfer money between bank accounts.

Figure 2:
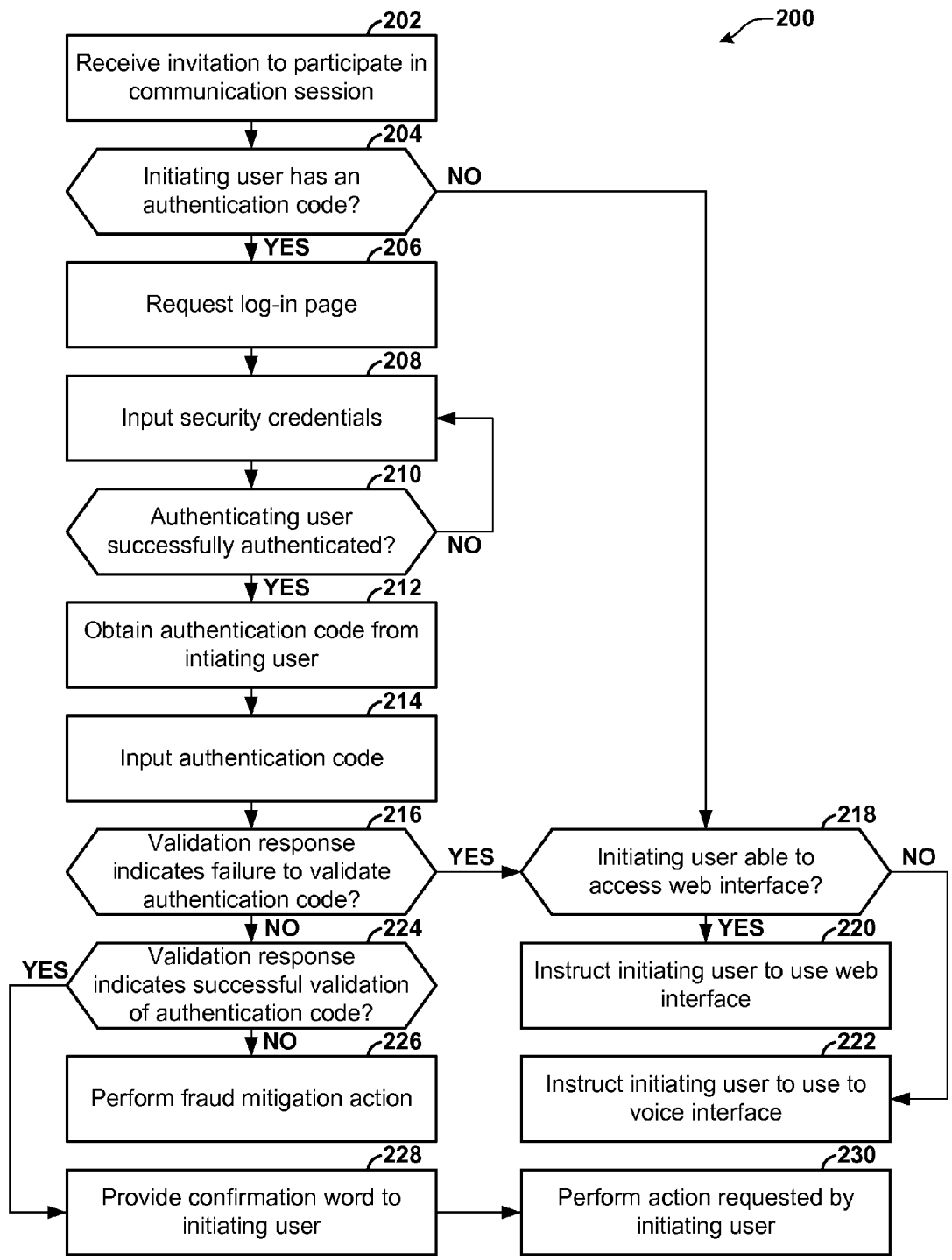
FIG. 2 is a flowchart illustrating an example operation performed by an authenticating user.

FIG. 2 is a flowchart illustrating an example operation 200 performed by the authenticating user 104. As illustrated in the example of FIG. 2, the operation 200 begins when the authenticating user 104 receives an invitation from a client communication device to participate in a communication session (202). In various embodiments, the authenticating user 104 receives the invitation in various ways. For example, in some embodiments, one of the communication devices 110 sends a message representing the invitation to the authenticator device 108. In response, the authenticator device 108 emits a notification sound (e.g., a ringtone) to notify the authenticating user 104 of the invitation. Furthermore, in some embodiments, the authenticator device 108 can display graphical user interface elements, vibrate, or perform some other action to notify the authenticating user 104 of the invitation.

After the authenticating user 104 accepts the invitation to participate in the communication session, the authenticating user 104 determines whether the initiating user 102 has already obtained an authentication code (204). In various embodiments, the authenticating user 104 determines whether the initiating user 102 has already obtained an authentication code in various ways. For example, in some embodiments, the authenticating user 104 determines whether the initiating user 102 has already obtained an authentication code by asking the initiating user 102 whether the initiating user 102 has already obtained an authentication code.

If the authenticating user 104 determines that the initiating user 102 has already obtained an authentication code ("YES" of 204), the authenticating user 104 uses the authenticator device 108 to request a log-in page from the server system 106 (206). The authenticating user 104 provides input to a web browser application operating on the authenticator device 108 to request the log-in page. When the web browser application receives the input, the web browser application sends a request to the web interface 116 of the server system 106 and receives data representing the log-in page from the web interface 116. The web browser application renders the data to display the log-in page to the authenticating user 104.

The log-in page includes one or more security credential fields. The security credential fields are designed to accept one or more security credentials. Security credentials include pieces of information provided by users that provide evidence that the users are who the users claim to be. Example types of security credentials include fixed passwords, one-time passwords, biometric data (fingerprints, thumbprints, retinal images, iris images, voice prints, etc.), and other types of information provided by a user that provides evidence that the user is who the user claims to be.

During a time that the authenticator device 108 displays the log-in page to the authenticating user 104, the authenticating user 104 inputs one or more security credentials into the security credential fields of the log-in page (208). For example, the authenticating user 104 can input a username and password into the security credential fields of the log-in page. After the authenticating user 104 inputs the security credentials, the authenticator device 108 sends the security credentials to the web interface 116 of the server system 106. When the web interface 116 receives the security credentials, the authentication application 120 attempts to verify the identity of the authenticating user 104 based on the security credentials.

If the security credentials are not sufficient for the server system 106 to successfully verify the identity of the authenticating user 104, the authenticator device 108 receives an identity verification failure response from the web interface 116. The identity verification failure response comprises data representing an error message. The error message indicates that the identity of the authenticating user 104 was not successfully verified based on the security credentials. The authenticator device 108 renders this data to display the error message to the authenticating user 104. If the identity of the authenticating user 104 was not successfully verified ("NO" of 210), the authenticating user 104 can input security credentials into the log-in page again (208).

If the security credentials are sufficient for the server system 106 to successfully verify the identity of the authenticating user 104, the authenticator device 108 receives an identity verification success response from the web interface 116. The identity verification success response comprises data representing a code authentication page. The authenticator device 108 renders the data to display the code authentication page to the authenticating user 104. The code authentication page includes a code entry feature.

If server system 106 successfully verified the identity of the authenticating user 104 based on the security credentials ("YES" of 210), the authenticating user 104 obtains the authentication code from the initiating user 102 (212). In various embodiments, the authenticating user 104 obtains the authentication code from the initiating user 102 in various ways. For example, in some embodiments, the authenticating user 104 obtains the authentication code from the initiating user 102 by verbally asking the initiating user 102 for the authentication code. In another example, the authenticating user 104 obtains the authentication code from the initiating user 102 by receiving a text message containing the authentication code from the initiating user 102.

After obtaining the authentication code, the authenticating user 104 inputs the authentication code into the code entry feature of the code authentication page (214). After the authenticating user 104 inputs the authentication code, the authenticator device 108 sends the authentication code to the web interface 116 of the server system 106. When the web interface 116 receives the authentication code, the authentication application 120 validates the authentication code. Subsequently, the authenticator device 108 receives a validation response from web interface 116. The validation response comprises data representing a message. The content of the message is dependent on whether the authentication application 120 successfully validated the authentication code.

When the authenticator device 108 receives the validation response, the authenticator device 108 presents the message to the authenticating user 104.

If message in the validation response indicates that the server system 106 failed to successfully validate the authentication code ("YES" of 216) or if the authenticating user 104 determines that the client does not have an authentication code ("NO" of 204), the authenticating user 104 determines whether the initiating user 102 is able to access the web interface 116 (218). The initiating user 102 may not be able to access the web interface 116 for a variety of reasons. For example, in some embodiments, the web interface 116 is not accessible to communication devices that are not directly connected a given local area network (LAN) or connected to the given LAN via a virtual private network (VPN) connection. For instance, the communication device 110A may not be able to access the web interface 116 unless the communication device 110A is connected to a corporate local area network or logged-in to a corporate VPN. In another example, the initiating user 102 may not be able to access the web interface 116 because the initiating user 102 does not have access to a communication device that supports web communication.

If the initiating user 102 is able to access the web interface 116 ("YES" of 218), the authenticating user 104 instructs the initiating user 102 to use the web interface 116 to obtain an authentication code (220). If the initiating user 102 is not able to access the web interface 116 ("NO" of 218), the authenticating user 104 instructs the initiating user 102 to use the voice interface 114 to obtain an authentication code (222). In various embodiments, the authenticating user 104 performs various actions after instructing the initiating user 102 to access the web interface 116 or the voice interface 114. For example, in some embodiments, the authenticating user 104 terminates the communication session after instructing the initiating user 102 to use the web interface 116 or the voice interface 114 to obtain an authentication code. In other embodiments, the authenticating user 104 waits until the initiating user 102 obtains an authentication code and then inputs the authentication code in step 214.

If the message in the validation response does not indicate that the authentication application 120 failed to validate the authentication code ("NO" of 216) and if the response message in the validation response does not indicate that the authentication application 120 successfully validated the authentication code ("NO" of 224), the authenticating user 104 refuses to perform an action requested by the initiating user 102 and instead performs one or more fraud mitigation actions (226). A fraud mitigation action is an action that prevents or mitigates potential fraud. In various embodiments, the authenticating user 104 performs various fraud mitigation actions. For example, the authenticating user 104 can alert an appropriate party, such as a supervisor, that the initiating user 102 provided an authentication code that had been previously used. In another example, the authenticating user 104 can record an entry in a log. The entry indicates that the initiating user 102 provided a suspicious authentication code.

If the message in the validation response indicates that the authentication application 120 successfully validated the authentication code ("YES" of 224), the authenticating user 104 provides a confirmation word associated with the authentication code to the initiating user 102 (228). The message in the validation response includes the confirmation word. In various embodiments, the authenticating user 104 provides the confirmation word to the initiating user 102 in various ways. For example, in some embodiments, the authenticating user 104 provides the confirmation word to the initiating user 102 by telling the confirmation word to the initiating user 102 via the communication session. In other embodiments, the authenticating user 104 provides the confirmation word to the initiating user 102 by sending a text message containing the confirmation word to the initiating user 102.

After providing the confirmation word to the initiating user 102, the authenticating user 104 performs an action requested by the initiating user 102 (230). In various embodiments, the authenticating user 104 performs various actions requested by the initiating user 102. For example, the authenticating user 104 can transfer money between accounts as specified by the initiating user 102. In another example, the authenticating user 104 can provide a balance of an account to the initiating user 102 as requested by the initiating user 102. In yet another example, the authenticating user 104 can close or open an account as requested by the initiating user 102. In yet another example, the authenticating user 104 can order goods or services as requested by the initiating user 102. In yet another example, the authenticating user 104 can instruct another person or a computing device to perform the action requested by the initiating user 102.

Figure 3:
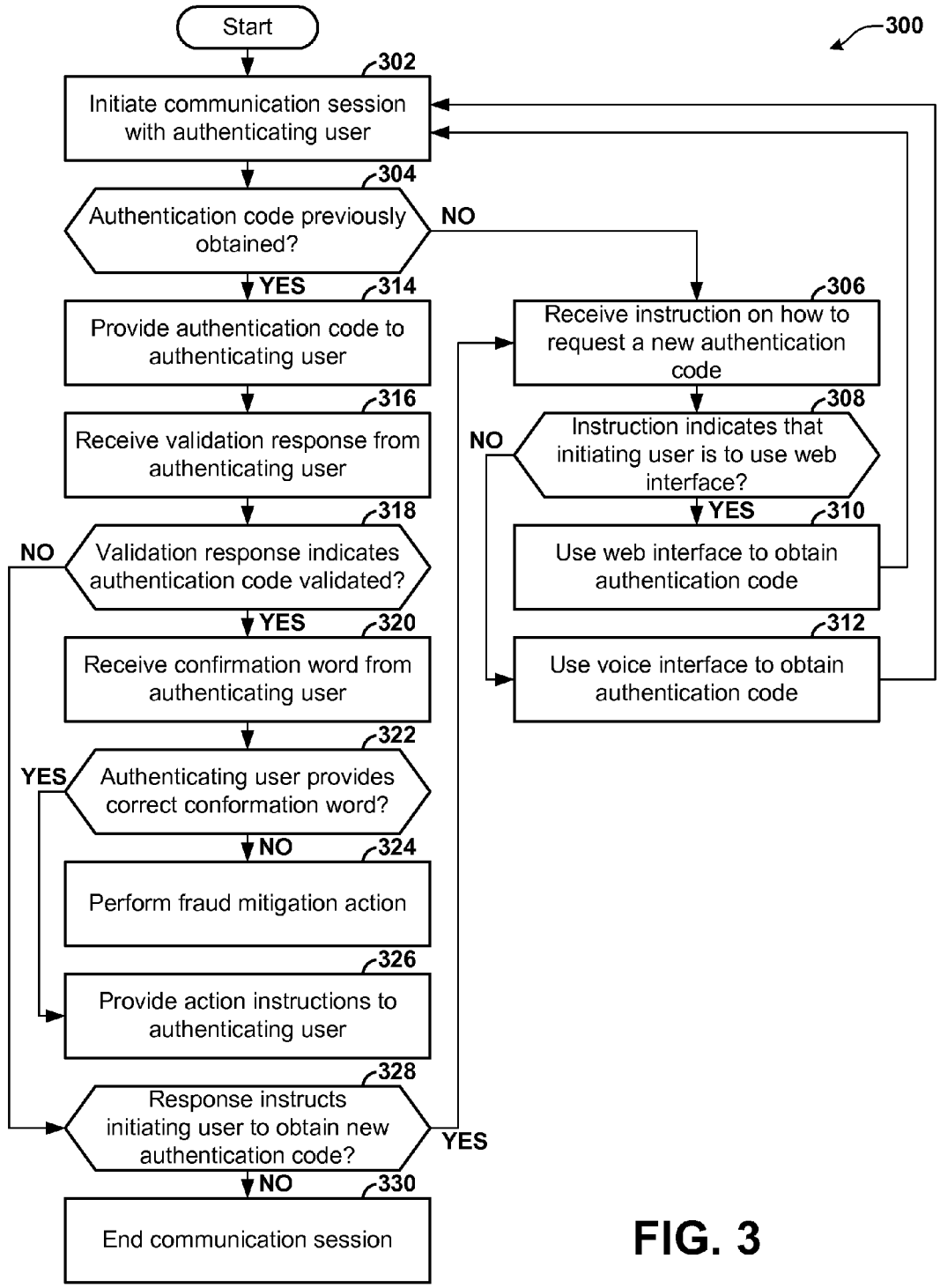
FIG. 3 is a flowchart illustrating an example operation performed by the initiating user.

FIG. 3 is a flowchart illustrating an example operation 300 performed by the initiating user 102. As illustrated in the example of FIG. 3, the operation 300 begins when the initiating user 102 uses one of the communication devices 110 to initiate a communication session with the authenticating user 104 (302). If the initiating user 102 has not yet obtained an authentication code and a confirmation word from the authentication application 120 ("NO" of 304), the initiating user 102 receives instructions from the authenticating user 104 on how to request the authentication code (306).

If the instructions indicate that the initiating user 102 is to use the web interface 116 to request an authentication code ("YES" of 308), the initiating user 102 uses the web interface 116 to request an authentication code (310). This document describes an example operation to use the web interface 116 with regard to FIG. 5. Otherwise, if the instructions indicate that the initiating user 102 is to use the voice interface 114 to request an authentication code ("NO" of 308), the initiating user 102 uses the voice interface 114 to request an authentication code (312). This document describes an example operation to use the voice interface 114 with regard to FIG. 4. In some embodiments, the initiating user 102 terminates the communication session with the authenticating user 104 after receiving the instructions on how to request an authentication code. After requesting and obtaining an authentication code, the initiating user 102 initiates a new communication session with the authenticating user 104 (302). In other embodiments, the authenticating user 104 waits while the initiating user 102 obtains an authentication code.

If the initiating user 102 has previously obtained an authentication code and an associated confirmation word ("YES" of 304), the initiating user 102 provides the authentication code to the authenticating user 104 (314). In various embodiments, the initiating user 102 provides the authentication code to the authenticating user 104 in various ways. For example, in some embodiments, the initiating user 102 provides the authentication code to the authenticating user 104 by speaking the authentication code to the authenticating user 104 via the communication session. In this example, the communication device sends audio data representing the authentication code to the authenticator device 108. In other embodiments, the initiating user 102 provides the authentication code to the authenticating user 104 by a text message. The initiating user 102 does not provide the confirmation word to the authenticating user 104.

After providing the authentication code to the authenticating user 104, the initiating user 102 receives a validation response from the authenticating user 104 via the communication session (316). The validation response indicates whether the authentication code was successfully validated.

If the validation response indicates that the authentication code was successfully validated ("YES" of 318), the initiating user 102 receives a confirmation word from the authenticating user 104 via the communication session (320). To receive the confirmation word, the communication device receives audio data representing the confirmation word from the authenticator device 108. If the confirmation word provided by the authenticating user 104 does not correspond to the confirmation word associated with the authentication code ("NO" of 322), the initiating user 102 does not instruct the authenticating user 104 to perform the action that the initiating user 102 wanted to request. Rather, the initiating user 102 performs one or more fraud mitigation actions (324). In various embodiments, the initiating user 102 performs various fraud mitigation actions. For example, in some embodiments, the initiating user 102 reports to an appropriate entity, such as a supervisor or a data security officer, that the authenticating user 104 was unable to provide the correct confirmation word.

Otherwise, if the confirmation word provided by the authenticating user 104 corresponds to the confirmation word received with the authentication code ("YES" of 322), the initiating user 102 provides action instructions to the authenticating user 104 via the communication session (326). The action instructions request the performance of one or more actions. For example, the initiating user 102 can instruct the authenticating user 104 to transfer money between two accounts. To send the action instructions to the authenticating user 104, the communication device can send audio data representing the action instructions to the authenticator device 108 via the communication session.

If the validation response does not indicate that the authentication code was successfully validated ("NO" of 318) and if the validation response does not instruct the initiating user 102 to obtain a new authentication code ("NO" of 328), the communication session ends (330). The communication session ends at this point because it is possible that the initiating user 102 is trying to commit fraud. For instance, when a usage limit on the authentication code has been reached, the validation response does not indicate that the authentication code was successfully validated and does not instruct the initiating user 102 to obtain a new authentication code. A person who tries to use an authentication code after a usage limit on the authentication code has been reached probably is not aware of how the authentication code has previously been used. Because a legitimate user knows how the authentication code has previously been used, it is likely that a person trying to use the authentication code after a usage limit on the authentication code has been reached is illegitimate.

If the validation response does not indicate that the authentication code was successfully validated ("NO" of 318) and if the validation response instructs the initiating user 102 to obtain a new authentication code ("YES" of 328), the initiating user 102 receives instructions from the authenticating user 104 on how to request a new authentication code (306). For instance, if the instructions indicate that the initiating user 102 is to use the web interface 116 to request the new authentication code ("YES" of 308), the initiating user 102 uses the web interface 116 to request the new authentication code (310). Otherwise, if the instructions do not indicate that the initiating user 102 is to use the web interface 112 to request the new authentication code ("NO" of 308), the initiating user 102 can use the voice interface 114 to request the new authentication code (312). After the initiating user 102 receives the new authentication code, the initiating user 102 can initiate another communication session with the authenticating user 104 and the operation 300 can recur.

Figure 4:
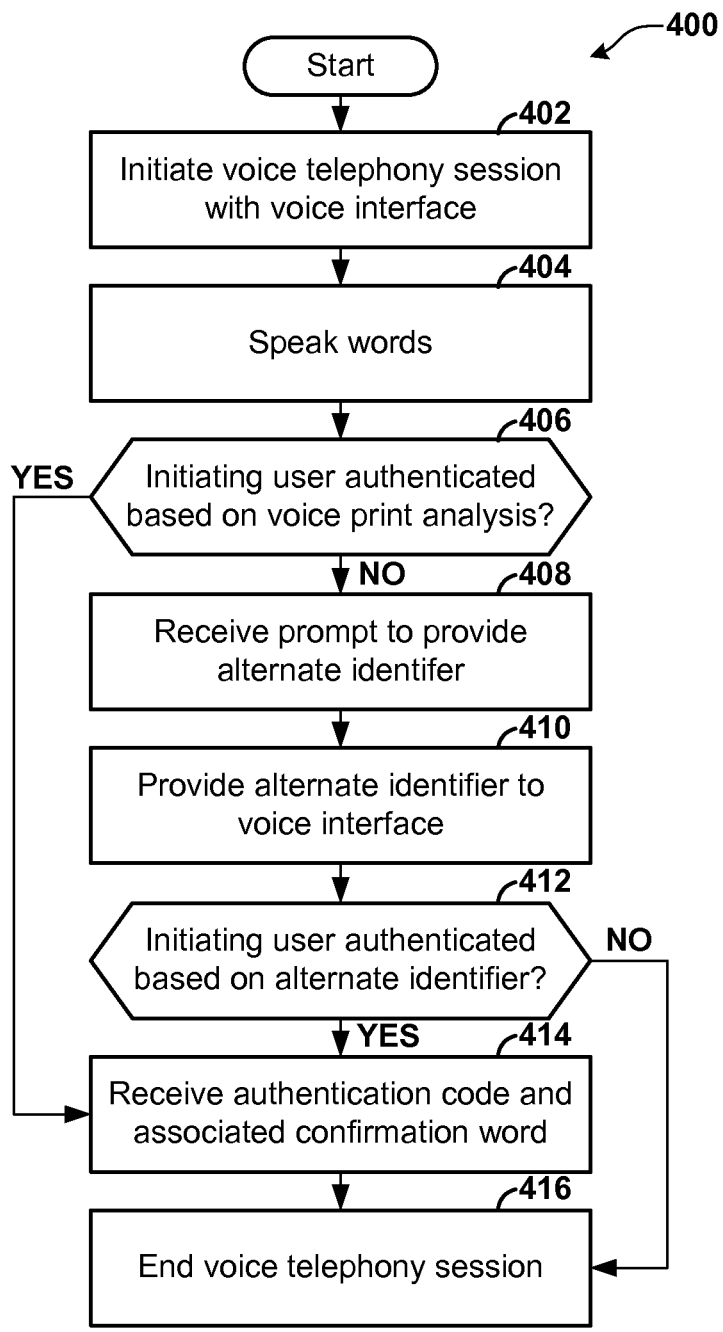
FIG. 4 is a flowchart illustrating an example operation performed by the initiating user to use a voice interface to obtain an authentication code and an associated confirmation word.

FIG. 4 is a flowchart illustrating an example operation 400 performed by the initiating user 102 to use the voice interface 114 to obtain an authentication code and an associated confirmation word. As illustrated in the example of FIG. 4, the operation 400 begins when the initiating user 102 initiates a voice telephony session with the voice interface 114 (402). In various embodiments, the initiating user 102 initiates a voice telephony session with the voice interface 114 in various ways. For example, in some embodiments, the initiating user 102 initiates a voice telephony session with the voice interface 114 by dialing a telephone number associated with the voice interface 114. In another embodiment, the initiating user 102 initiates a voice telephony session by selecting a graphical user interface control associated with initiating a voice telephony session with the voice interface 114. In some embodiments, initiating the voice telephony session with the voice interface constitutes an authentication code request. In other embodiments, the initiating user 102 performs one or more other steps to indicate to the authentication application 120 that the initiating user 102 wants to request a confirmation code.

After initiating the voice telephony session, the initiating user 102 speaks one or more words to the voice interface 114 via the voice telephony session (404). In various embodiments, the initiating user 102 speaks various words. For example, in some embodiments, the initiating user 102 can state his or her name. In other embodiments, the initiating user 102 can verbally state a request for an authentication code. When the voice interface 114 receives the words, the authentication application 120 attempts to authenticate an identity of the initiating user 102 based on a voice print analysis of the words.

If the authentication application 120 does not successfully authenticate the identity of the initiating user 102 based on the voice print analysis ("NO" of 406), the initiating user 102 receives a prompt from the voice interface 114 to provide an alternate identifier (408). The alternate identifier is a set of information that purports to identify the initiating user 102. In various embodiments, the alternate identifier comprises various types of information. For example, in some embodiments, the alternate identifier comprises a social security number and a birthday. In other embodiments, the alternate identifier is a number generated by a security token.

In response to receiving the prompt to provide an alternate identifier, the initiating user 102 provides an alternate identifier to the voice interface 114 (410). In various embodiments, the initiating user 102 provides the alternate identifier to the voice interface 114 in various ways. For example, in some embodiments, the initiating user 102 provides the alternate identifier to the voice interface 114 by dialing numbers into a keypad of one of the communication devices 110. In other embodiments, the initiating user 102 provides the alternate identifier to the voice interface 114 by speaking the alternate identifier. When the voice interface 114 receives the alternate identifier, the authentication application 120 attempts to authenticate the initiating user 102 based on the alternate identifier.

If the authentication application 120 does not successfully authenticate the initiating user 102 based on the alternate identifier ("NO" of 412), the voice telephony session ends (416). If the authentication application 120 successfully authenticates the identity of the initiating user 102 based on the voice print analysis ("YES" of 406) or if the authentication application 120 successfully authenticates the initiating user 102 based on the alternate identifier ("YES" of 412), the initiating user 102 receives an authentication code and an associated confirmation word from the voice interface 114 via the voice telephony session (414). After the initiating user 102 receives the authentication code and the confirmation word, the voice telephony session ends (416).

Figure 5:
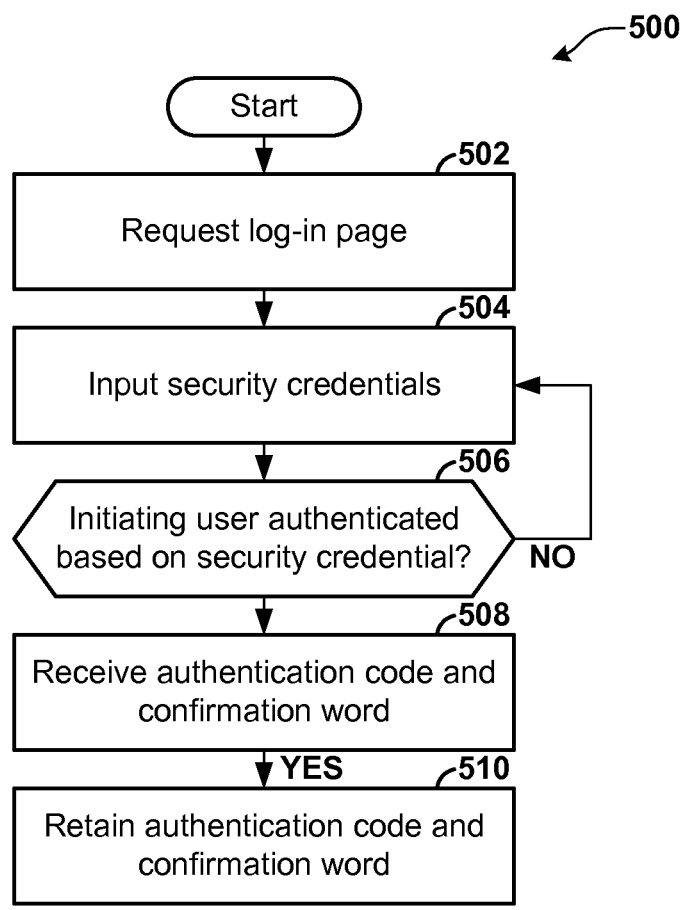
FIG. 5 is a flowchart illustrating an example operation performed by the initiating user to use a web interface to obtain an authentication code and an associated confirmation word.

FIG. 5 is a flowchart illustrating an example operation 500 performed by the initiating user 102 to use the web interface 116 to obtain an authentication code and an associated confirmation word. For purposes of explanation, the operation 500 is explained with reference to the communication device 110B. However, in some embodiments, the operation 500 could also be performed by the communication device 110A or another communication device.

As illustrated in the example of FIG. 5, the operation 500 begins when the initiating user 102 uses the communication device 110B to request a log-in page (502). In various embodiments, the initiating user 102 uses the communication device 110B to request the log-in page in various ways. For example, in some embodiments, a web browser application operates on the communication device 110B. In this example, the initiating user 102 requests the log-in page by entering a uniform resource locator (URL) associated with the log-in page into a user interface of the web browser application or by selecting a link or control associated with the log-in page.

When the initiating user 102 uses the communication device 110B to request the log-in page, the initiating user 102 sends a request for the log-in page to the web interface 116 of the server system 106. In response to the request, the communication device 110B receives data representing the log-in page. The communication device 110B renders the data to present the log-in page to the initiating user 102. The log-in page includes one or more security credential fields. The security credential fields are designed to accept one or more security credentials. For example, the log-in page can include one or more text boxes configured to accept security credentials.

When the communication device 110B presents the log-in page to the initiating user 102, the initiating user 102 inputs security credentials into the security credential fields of the log-in page (504). After the initiating user 102 inputs the security credentials, the communication device 110B sends the security credentials to the web interface 116. When the web interface 116 receives the security credentials, the authentication application 120 attempts to authenticate an identity of the initiating user 102 based on the security credentials. If the security credentials are not sufficient for the authentication application 120 to successfully authenticate the identity of the initiating user 102, the communication device 110B receives an authentication failure response that indicates that the initiating user 102 was not successfully authenticated. If the security credentials are sufficient for the authentication application 120 to successfully authenticate the identity of the initiating user 102, the communication device 110B receives an authentication success response comprising data representing an authentication code and a confirmation word. The communication device 110B presents the authentication code and the associated confirmation word to the initiating user 102.

If the authentication application 120 does not successfully authenticate the initiating user 102 ("NO" of 506), the initiating user 102 can re-input the security credentials into the security credential fields of the log-in page and try again (504). Otherwise, if the authentication application 120 successfully authenticates the initiating user 102 based on the security credentials ("YES" of 506), the initiating user 102 receives the authentication code and the associated confirmation word from the authentication application 120 (508). The initiating user 102 retains the authentication code and the associated confirmation word for future use (510).

Figure 6:
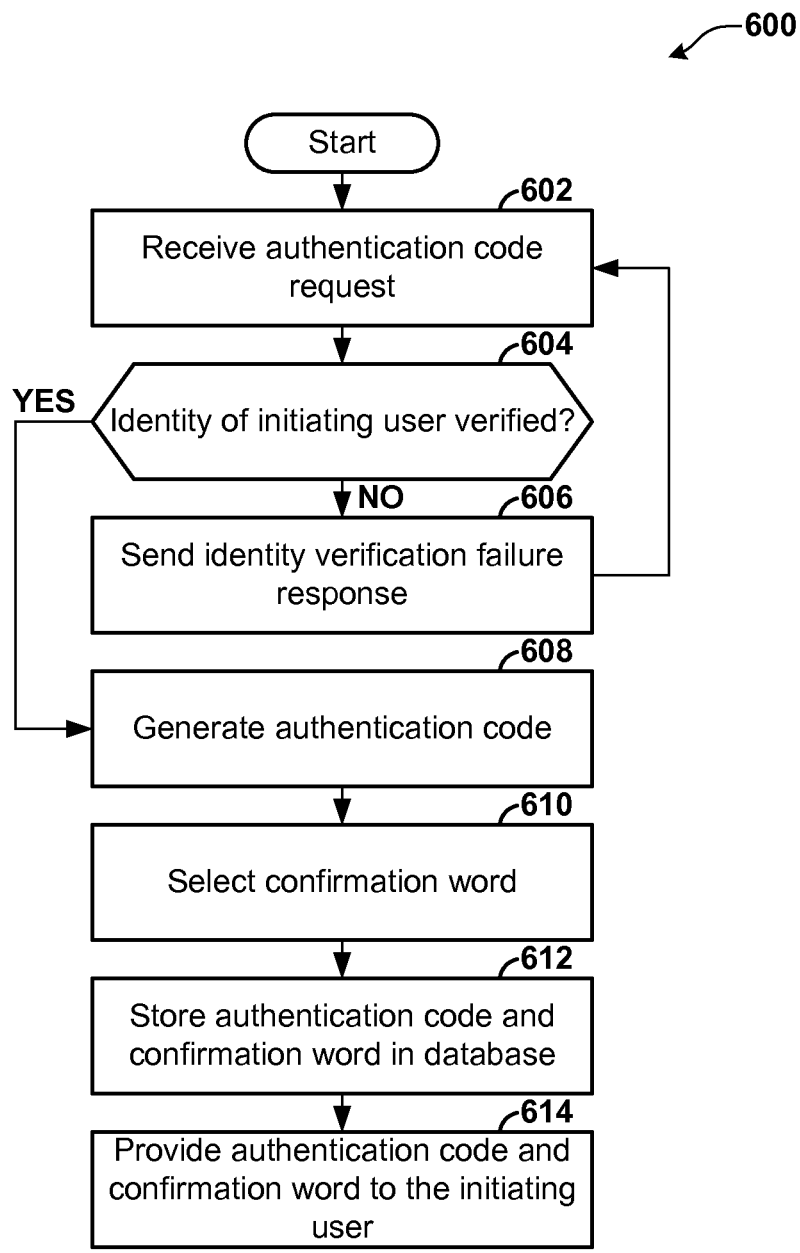
FIG. 6 is a flowchart illustrating an example operation performed by an authentication application in response to an authentication code request.

FIG. 6 is a flowchart illustrating an example operation 600 performed by the authentication application 120 in response to an authentication code request. As illustrated in the example of FIG. 6, the operation 600 begins when the authentication application 120 receives an authentication code request from the initiating user 102 (602). The authentication code request is a request for an authentication code. The authentication application 120 can receive the authentication code request via the voice interface 114 or the web interface 116.

After receiving the authentication code request and the security credentials, the authentication application 120 attempts to verify the identity of the initiating user 102 (604). In various embodiments, the authentication application 120 attempts to verify the identity of the initiating user 102 in various ways. For example, if the authentication application 120 received the authentication code request via the web interface 116, the authentication application 120 attempts to verify the identity of the initiating user 102 by validating one or more security credentials provided by the initiating user 102 via the web interface 116. In this example, if the authentication application 120 received the authentication code request via the voice interface 114, the authentication application 120 attempts to verify the identity of the initiating user 102 using a voice print analysis or using an alternate identifier.

If the authentication application 120 was unable to verify the identity of the initiating user 102 ("NO" of 604), the authentication application 120 sends an identity verification failure response to the initiating user 102 (606). Subsequently, the authentication application 120 can receive another authentication code request from the initiating user 102 (602).

If the authentication application 120 was able to verify the identity of the initiating user 102 ("YES" of 604), the authentication application 120 generates an authentication code (608). In various embodiments, the authentication application 120 generates the authentication code in various ways. For example, in some embodiments, the authentication application 120 uses the MICROSOFT™ WINDOWS 2003™ Server Crypto API libraries to generate one or more pseudo-random numbers that are combined to form the authentication code. In other embodiments, the authentication application 120 uses other APIs or code to generate pseudo-random numbers used in the authentication code.

In some embodiments, when the authentication application 120 generates an authentication code in response to an authentication code request from the initiating user 102, the authentication application 120 automatically cancels any authentication codes generated in response to previous authentication code requests from the initiating user 102. In this way, the initiating user 102 can obtain a new authentication code if the initiating user 102 becomes concerned that a previously-generated authentication code has been compromised.

The authentication application 120 then selects a confirmation word to be associated with the authentication code (610). In various embodiments, the authentication application 120 selects the confirmation word in various ways. For example, in some embodiments, the server system 106 stores a list of natural-language words. In this example, the authentication application 120 can select the confirmation word from the list of natural-language words on a pseudo-random basis. In this example, confirmation words in the list are words that are easy to remember. In another example, the server system 106 selects the confirmation word by selecting a series of characters on a pseudo-random basis.

After selecting the confirmation word, the authentication application 120 stores the authentication code and the confirmation word in the database 122 (612). In various embodiments, the authentication application 120 stores the authentication code and the associated confirmation word in the database 122 in various ways. For example, in some embodiments, the authentication application 120 generates a new database record in the database 122. The new database record includes a field for the authentication code, a field for the associated confirmation word, and fields associated with usage limitations on the authentication code. In various embodiments, the fields are associated with various usage limitations. For instance, if a usage limitation on the authentication code specifies that the authentication code cannot be used more than a given number of times, the database record can include a field indicating how many times the authentication code has been used. If a usage limitation on the authentication code specifies that the authentication code cannot be used more than a given amount of time after the authentication code was generated, the database record can include a field indicating the time when the authentication code was generated. In another example, the authentication application 120 creates separate database records for the authentication code and the confirmation word and uses index numbers to associate the authentication code with the confirmation word.

The authentication application 120 then provides the authentication code and the confirmation word to the initiating user 102 (614). In various embodiments, the authentication application 120 provides the authentication code and the confirmation word to the initiating user 102 in various ways. For example, in some embodiments, when the authentication application 120 receives the authentication code request from the communication device 110B via the web interface 116, the authentication application 120 sends data representing a web page to the communication device 110B. The web page contains the authentication code and the associated confirmation word. In this example, the communication device 110B renders the data to present the web page to the initiating user 102. In another example, when the authentication application 120 receives the authentication code request from the communication device 110A via the voice interface 114, the authentication application 120 sends a vocalization of the authentication code and the associated confirmation word to the communication device 110A.

Figure 7:
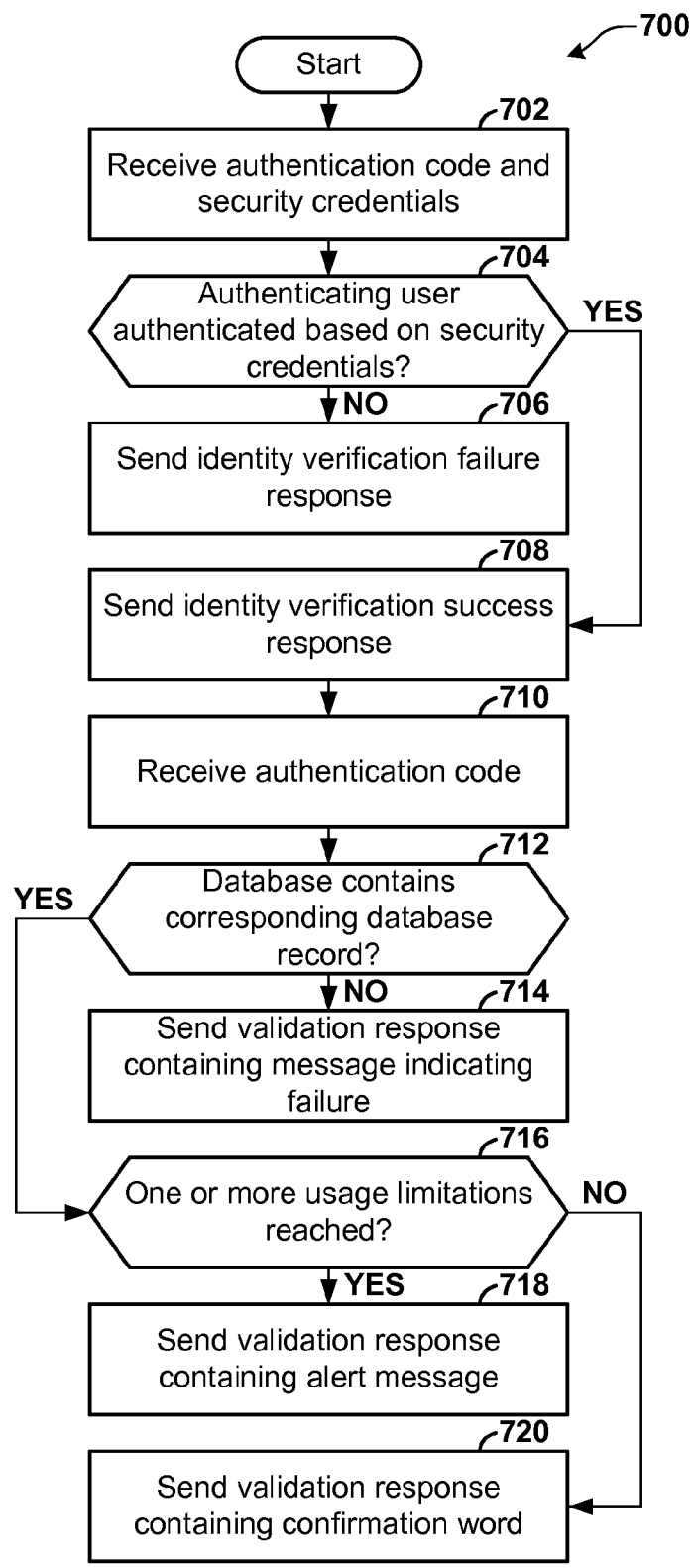
FIG. 7 is a flowchart illustrating an example operation performed by the authentication application in response to receiving an authentication code.

FIG. 7 is a flowchart illustrating an example operation 700 performed by the authentication application 120 in response to receiving an authentication code. As illustrated in the example of FIG. 7, the operation 700 begins when the authentication application 120 receives an authentication code and security credentials from the authenticating user 104 (702). In response to receiving the authentication code and the security credentials, the authentication application 120 attempts to verify the identity of the authenticating user 104 based on the security credentials (704).

If the authentication application 120 does not successfully verify the identity of the authenticating user 104 based on the security credentials ("NO" of 704), the authentication application 120 sends an identity verification failure response to the authenticator device 108 (706). The identity verification failure response indicates that the authentication application 120 could not verify the identity of the authenticating user 104 based on the security credentials. In various embodiments, the authentication application 120 sends the identity verification failure response to the authenticator device 108 in various ways. For example, in some embodiments, the authentication application 120 sends data representing a web page to the authenticator device 108. The web page contains a message indicating that the authentication application 120 failed to verify the identity of the authenticating user 104 based on the security credentials. The authenticator device 108 renders the data and displays the web page to the authenticating user 104. In another example, the authentication application 120 sends XML data to the authenticator device 108. The XML data contains a message indicating that the authentication application 120 failed to verify the identity of the authenticating user 104 based on the security credentials. The authenticator device 108 processes the XML data to display the message in a web page already displayed to the authenticating user 104.

If the authentication application 120 successfully verified the identity the authenticating user 104 based on the security credentials ("YES" of 704), the authentication application 120 sends an identity verification success response to the authenticator device 108 (708). The identity verification success response comprises data representing a code authentication page. The code authentication page includes a code entry feature that allows the authenticating user 104 to enter an authentication code. After sending the identity verification success response, the authentication application 120 receives an authentication code from the authenticating user 104 (710).

In response to receiving the authentication code, the authentication application 120 determines whether the database 122 contains a corresponding database record (712). The corresponding database record is a database record that specifies the authentication code. If the database 122 does not contain the corresponding database record ("NO" of 712), the authentication application 120 sends to the authenticator device 108 a validation response comprising a message indicating that the authentication application 120 failed to validate the authentication code (714).

If the database 122 contains the corresponding database record ("YES" of 712), the authentication application 120 determines whether a usage limitation on the authentication code has been reached (716). In various embodiments, the authentication application 120 determines whether various usage limitations on the authentication code have been reached. For example, in some embodiments, the authentication application 120 determines that a usage limitation on the authentication code has been reached when the authentication code has been used more than a given number of times. For instance, the given number of times can be one time, two times, three times, or another number of times. In another example, in some embodiments, the authentication application 120 determines that a usage limitation on the authentication code has been reached when more than a given amount of time has passed after the authentication code was generated. For instance, the given amount of time can be fifteen minutes, thirty minutes, one hour, four hours, twenty-four hours, or some other amount of time. In yet another example, the authentication application 120 determines that a usage limitation on the authentication code has been reached when the authentication application 120 has generated a new authentication code in response to an authentication code request from the initiating user 102 after the authentication application 120 generated the authentication code provided to the authenticating user 104.

If one or more usage limitations on the authentication code have been reached ("YES" of 716), the authentication application 120 sends to the authenticator device 108 a validation response containing an alert message (718). The alert message specifies that the authenticating user 104 is to perform one or more fraud mitigation actions. The authentication application 120 sends a validation response containing an alert message when a usage limitation on the authentication code has been reached because legitimate initiating users would not attempt to use an authentication code when the initiating users know that the usage limitation on the authentication code has been reached.

If no usage limitation on the authentication code has been reached ("NO" of 716), the authentication application 120 sends to the authenticator device 108 a validation response containing the confirmation word associated with the authentication code (720).

Figure 8:
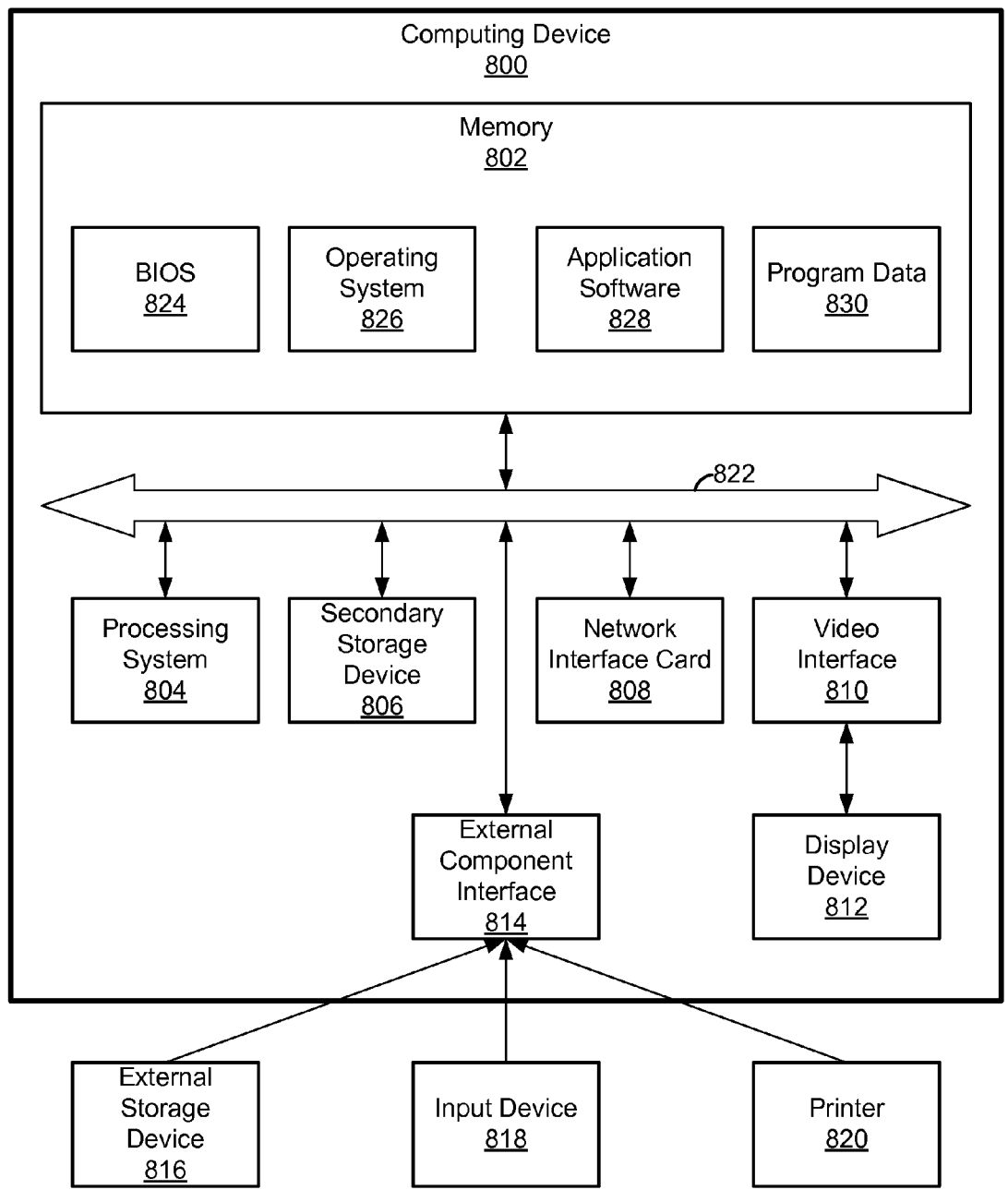
FIG. 8 is a block diagram illustrating an example computing device usable in the system.

FIG. 8 is a block diagram illustrating an example computing device 800 usable in the system 100. In some embodiments, the authenticator device 108, the communication devices 110, and computing devices in the server system 106 are implemented using one or more computing devices like the computing device 800. It should be appreciated that in other embodiments, the authenticator device 108, the communication devices 110, and computing devices in the server system 106 are implemented using computing devices having hardware components other than those illustrated in the example of FIG. 8.

In different embodiments, computing devices are implemented in different ways. For instance, in the example of FIG. 8, the computing device 800 comprises a memory 802, a processing system 804, a secondary storage device 806, a network interface card 808, a video interface 810, a display device 812, an external component interface 814, an external storage device 816, an input device 818, a printer 820, and a communication medium 822. In other embodiments, computing devices are implemented using more or fewer hardware components. For instance, in another example embodiment, a computing device does not include a video interface, a display device, an external storage device, or an input device.

The memory 802 includes one or more computer-readable data storage media capable of storing data and/or instructions. In different embodiments, the memory 802 is implemented in different ways. For instance, in various embodiments, the memory 802 is implemented using various types of computer-readable data storage media. Example types of computer-readable data storage media include, but are not limited to, dynamic random access memory (DRAM), double data rate synchronous dynamic random access memory (DDR SDRAM), reduced latency DRAM, DDR2 SDRAM, DDR3 SDRAM, Rambus RAM, solid state memory, flash memory, read-only memory (ROM), electrically-erasable programmable ROM, and other types of devices and/or articles of manufacture that store data.

The processing system 804 includes one or more physical integrated circuits that selectively execute software instructions. In various embodiments, the processing system 804 is implemented in various ways. For instance, in one example embodiment, the processing system 804 is implemented as one or more processing cores. For instance, in this example embodiment, the processing system 804 may be implemented as one or more Intel Core 2 microprocessors. In another example embodiment, the processing system 804 is implemented as one or more separate microprocessors. In yet another example embodiment, the processing system 804 is implemented as an ASIC that provides specific functionality. In yet another example embodiment, the processing system 804 provides specific functionality by using an ASIC and by executing software instructions.

In different embodiments, the processing system 804 executes software instructions in different instruction sets. For instance, in various embodiments, the processing system 804 executes software instructions in instruction sets such as the x86 instruction set, the POWER instruction set, a RISC instruction set, the SPARC instruction set, the IA-64 instruction set, the MIPS instruction set, and/or other instruction sets.

The secondary storage device 806 includes one or more computer-readable data storage media. The secondary storage device 806 stores data and software instructions not directly accessible by the processing system 804. In other words, the processing system 804 performs an I/O operation to retrieve data and/or software instructions from the secondary storage device 806. In various embodiments, the secondary storage device 806 is implemented by various types of computer-readable data storage media. For instance, the secondary storage device 806 may be implemented by one or more magnetic disks, magnetic tape drives, CD-ROM discs, DVD-ROM discs, Blu-Ray discs, solid state memory devices, Bernoulli cartridges, and/or other types of computer-readable data storage media. In some embodiments, computer program products include such computer-readable data storage media.

The network interface card 808 enables the computing device 800 to send data to and receive data from a computer communication network. In different embodiments, the network interface card 808 is implemented in different ways. For example, in various embodiments, the network interface card 808 is implemented as an Ethernet interface, a token-ring network interface, a fiber optic network interface, a wireless network interface (e.g., WiFi, WiMax, etc.), or another type of network interface.

The video interface 810 enables the computing device 800 to output video information to the display device 812. In different embodiments, the video interface 810 is implemented in different ways. For instance, in one example embodiment, the video interface 810 is integrated into a motherboard of the computing device 800. In another example embodiment, the video interface 810 is a video expansion card. Example types of video expansion cards include Radeon graphics cards manufactured by ATI Technologies, Inc. of Markham, Ontario, Geforce graphics cards manufactured by Nvidia Corporation of Santa Clara, Calif., and other types of graphics cards.

In various embodiments, the display device 812 is implemented as various types of display devices. Example types of display devices include, but are not limited to, cathode-ray tube displays, LCD display panels, plasma screen display panels, touch-sensitive display panels, LED screens, projectors, and other types of display devices. In various embodiments, the video interface 810 communicates with the display device 812 in various ways. For instance, in various embodiments, the video interface 810 communicates with the display device 812 via a Universal Serial Bus (USB) connector, a VGA connector, a digital visual interface (DVI) connector, an S-Video connector, a High-Definition Multimedia Interface (HDMI) interface, a DisplayPort connector, or other types of connectors.

The external component interface 814 enables the computing device 800 to communicate with external devices. In various embodiments, the external component interface 814 is implemented in different ways. For instance, in one example embodiment, the external component interface 814 is a USB interface. In other example embodiments, the computing device 800 is a FireWire interface, a serial port interface, a parallel port interface, a PS/2 interface, and/or another type of interface that enables the computing device 800 to communicate with external components.

In different embodiments, the external component interface 814 enables the computing device 800 to communicate with different external components. For instance, in the example of FIG. 8, the external component interface 814 enables the computing device 800 to communicate with the external storage device 816, the input device 818, and the printer 820. In other embodiments, the external component interface 814 enables the computing device 800 to communicate with more or fewer external components. Other example types of external components include, but are not limited to, speakers, phone charging jacks, modems, media player docks, other computing devices, scanners, digital cameras, a fingerprint reader, and other devices that can be connected to the computing device 800.

The external storage device 816 is an external component comprising one or more computer readable data storage media. Different implementations of the computing device 800 interface with different types of external storage devices. Example types of external storage devices include, but are not limited to, magnetic tape drives, flash memory modules, magnetic disk drives, optical disc drives, flash memory units, zip disk drives, optical jukeboxes, and other types of devices comprising one or more computer-readable data storage media. The input device 818 is an external component that provides user input to the computing device 800. Different implementations of the computing device 800 interface with different types of input devices. Example types of input devices include, but are not limited to, keyboards, mice, trackballs, stylus input devices, key pads, microphones, joysticks, touch-sensitive display screens, and other types of devices that provide user input to the computing device 800. The printer 820 is an external device that prints data to paper. Different implementations of the computing device 800 interface with different types of printers. Example types of printers include, but are not limited to laser printers, ink jet printers, photo printers, copy machines, fax machines, receipt printers, dot matrix printers, or other types of devices that print data to paper.

The communications medium 822 facilitates communication among the hardware components of the computing device 800. In different embodiments, the communications medium 822 facilitates communication among different components of the computing device 800. For instance, in the example of FIG. 8, the communications medium 822 facilitates communication among the memory 802, the processing system 804, the secondary storage device 806, the network interface card 808, the video interface 810, and the external component interface 814. In different implementations of the computing device 800, the communications medium 822 is implemented in different ways. For instance, in different implementations of the computing device 800, the communications medium 822 may be implemented as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 802 stores various types of data and/or software instructions. For instance, in the example of FIG. 8, the memory 802 stores a Basic Input/Output System (BIOS) 824, an operating system 826, application software 828, and program data 830. The BIOS 824 includes a set of software instructions that, when executed by the processing system 804, cause the computing device 800 to boot up. The operating system 826 includes a set of software instructions that, when executed by the processing system 804, cause the computing device 800 to provide an operating system that coordinates the activities and sharing of resources of the computing device 800. Example types of operating systems include, but are not limited to, MICROSOFT® WINDOWS®, Linux, Unix, Apple OS X, Apple OS X iPhone, Palm webOS, Palm OS, Google Chrome OS, Google Android OS, and so on. The application software 828 includes a set of software instructions that, when executed by the processing system 804, cause the computing device 800 to provide applications to a user of the computing device 800. The program data 430 is data generated and/or used by the application software 828. In some embodiments, the memory 802 or another computer-readable data storage medium in or attached to the computing device 800 stores software instructions that, when executed by the processing system 804, cause the computing device 800 to perform the actions of computing devices described above.

The various embodiments described above are provided by way of illustration only and should not be construed as limiting. Those skilled in the art will readily recognize various modifications and changes that may be made without following the example embodiments and applications illustrated and described herein.

I claim:

1. A method for determining whether to provide action instructions, the method comprising:
    sending, by an initiating user, an authentication code request to a server system;
    receiving, by the initiating user, an authentication code and a first confirmation word from the server system in response to the authentication code request, the first confirmation word being associated with the authentication code;
    initiating by the initiating user, through a communication device, a communication session with an authenticating user;
    providing, by the initiating user, the authentication code to the authenticating user without providing the first confirmation word to the authenticating user, the authenticating user having no access to the first confirmation word when a usage limitation on the authentication code has been reached;
    receiving, by the initiating user, a second related confirmation word from the authenticating user after providing the authentication code to the authenticating user; and
    after receiving the second confirmation word, providing, by the initiating user, action instructions to the authenticating user via the communication session when the second confirmation word corresponds to the first confirmation word, wherein the action instructions request performance of an action.

2. The method of claim 1,
    wherein sending the authentication code request to the server system comprises:
        initiating, by the initiating user, a voice telephony session with a voice interface of the server system; and
        speaking, by the initiating user, one or more words to the voice interface; and
    wherein the initiating user receives the authentication code and the first confirmation word via the voice telephony session when a voice print analysis of the one or more words authenticates an identity of the initiating user.

3. The method of claim 1,
wherein sending the authentication code request to the server system comprises:
requesting, by the initiating user, a log-in page from a web interface of the server system; and
inputting, by the initiating user, one or more security credentials into one or more security credential fields of the log-in page; and
wherein the initiating user receives the authentication code and the first confirmation word when the one or more security credentials are sufficient to authenticate an identity of the initiating user.

4. The method of claim 3, further comprising: receiving, by the initiating user, instructions from the authenticating user to use a voice interface of the server system to request the authentication code when the initiating user does not have access to the web interface.

5. The method of claim 1, wherein the action instructions instruct the authenticating user to transfer money between bank accounts.

6. The method of claim 1, wherein the usage limitation on the authentication code is reached when the authentication code has been provided to the server system more than a given number of times.

7. The method of claim 1, wherein the usage limitation on the authentication code is reached when a given amount of time has passed after the authentication code was generated.

8. The method of claim 1, wherein the usage limitation on the authentication code is reached when the initiating user has sent another authentication code request to the server system after the initiating user received the authentication code from the server system.

9. The method of claim 1, further comprising: sending, by the initiating user, a second authentication code request to the server system in response to the initiating user receiving a validation response from the authenticating user indicating that the authenticating user was unable to validate the authentication code.

10. The method of claim 1, further comprising: performing, by the initiating user, a fraud mitigation action after determining that the second confirmation word does not correspond to the first confirmation word.

11. A method for determining whether to perform requested actions, the method comprising:
accepting, by an authenticating user, an invitation to join a communication session with an initiating user;
receiving, by the authenticating user, an authentication code from the initiating user without receiving an associated first confirmation word from the initiating user;
sending, by the authenticating user, the authentication code to a server system;
receiving, by the authenticating user, a second confirmation word related to the first confirmation word from the server system when the authentication code corresponds to a previously-generated authentication code and no usage limitation on the authentication code has been reached;
providing, by the authenticating user, the second confirmation word to the initiating user after receiving the second confirmation word from the server system;
performing an action requested by the initiating user when the authentication code corresponds to the previously-generated authentication code and no usage limitation on the authentication code has been reached; and
refusing, by the authenticating user, to perform the action requested by the initiating user when the authentication code does not correspond the previously-generated authentication code or the usage limitation on the authentication code has been reached.

12. The method of claim 11,
wherein the method further comprises:
sending, by the authenticating user, a request for a log-in page; and
inputting, by the authenticating user, one or more security credentials into the log-in page; and
wherein sending the authentication code to the server system comprises: inputting, by the authenticating user, the authentication code into a code authentication page presented to the authenticating user when the one or more security credentials are sufficient to authenticate an identity of the authenticating user.

13. The method of claim 11, further comprising: performing a fraud mitigation action when the authentication code corresponds to the previously-generated authentication code and the usage limitation on the authentication code has been reached.

14. The method of claim 13, wherein performing the fraud mitigation action comprises: alerting an appropriate party that the initiating user provided the authentication code that had previously been used.

15. The method of claim 11, wherein the usage limitation on the authentication code is reached when the authentication code has been provided to the server system more than a given number of times.

16. The method of claim 11, wherein the usage limitation on the authentication code is reached when a given amount of time has passed after generation of the authentication code.

17. The method of claim 11, further comprising:
instructing, by the authenticating user, the initiating user to use a voice interface of the server system to request a new authentication code after determining that the initiating user does not have access to a web interface of the server system through which the authentication code can be obtained.

18. The method of claim 11, wherein the associated second confirmation word comprises one or more words selected from a list of natural-language words.

19. A computing system comprising:
a data storage system that stores instructions; and
a processing system that executes the instructions, execution of the instructions by the processing system causing the computing system to:
initiate a communication session with an authenticating user;
send audio data representing an authentication code associated with an initiating user to an authenticator device of the authenticating user via the communication session without providing an associated first confirmation word to the authenticating user, the authenticating user having no access to the first confirmation word when a usage limitation on the authentication code has been reached;
receive audio data representing a second confirmation word related to the first confirmation word from the authenticator device; and
after receiving the audio data representing the second confirmation word, send audio data representing action instructions requested by the initiating user to the authenticator device via the communication session when the second confirmation word corresponds to the first confirmation word, wherein the action instructions request performance of an action.

20. The computing system of claim 19, wherein execution of the instructions by the processing system further causes the computing system to:
  send an authentication code request to a server system; and
  receive data representing the authentication code and the first confirmation word from the server system in response to the authentication code request.

21. The computing system of claim 19, wherein the usage limitation on the authentication code is reached when the authentication code has been provided to the server system more than a given number of times.

22. A server system comprising:
  a data storage system that stores instructions; and
  a processing system that executes the instructions, execution of the instructions by the processing system causing the processing system to:
    generate a first authentication code and a first confirmation word associated with the first authentication code in response to an authentication code request received from a first device, the first device associated with a first user;
    receive a validation request from a second device, the second device associated with a second user, the validation request specifying a second authentication code;
    determine, after receiving the validation request, whether the second authentication code corresponds to the first authentication code;
    determine whether a usage limitation on the first authentication code has been reached;
    after determining that the second authentication code corresponds to the first authentication code and after determining that the usage limitation on the first authentication code has not been reached, send a second confirmation word related to the first confirmation word to the second device, the server system not sending the second confirmation word to the second device after determining that the second authentication code does not correspond to the first authentication code or after determining that the usage limitation on the first authentication code has been reached.

23. The server system of claim 22, wherein execution of the instructions by the processing system causes the server system to send an alert message to the second device after the server system determines that the usage limitation on the first authentication code has been reached.

24. A system comprising:
  a communication device associated with an initiating user, the communication device comprising:
    a first data storage system, the first data storage system comprising a first set of instructions; and
    a first processing system, the first processing system executes the first set of instructions;
  an authenticator device associated with an authenticating user, the authenticator device comprising:
    a second data storage system, the second data storage system comprising a second set of instructions; and
    a second processing system, the second processing system executing the second set of instructions; and
  a server system that comprises:
    a third data storage system, the third data storage system comprising a third set of instructions; and
    a third processing system, the third processing system executing the third set of instructions; and
  wherein execution of the first set of instructions by the first processing system causes the communication device to send an authentication code request to the server system;
  wherein execution of the third set of instructions by the third processing system causes the server system to send an authentication code and an first associated confirmation word to the initiating user in response to the authentication code request;
  wherein execution of the first set of instructions by the first processing system, causes the communication device to communicate with the authenticator device to establish a communication session between the initiating user and the authenticating user, the initiating user using the communication session to provide the authentication code but not the first associated confirmation word to the authenticating user;
  wherein execution of the second set of instructions by the second processing system causes the authenticator device to send the authentication code to the server system;
  wherein execution of the third set of instructions by the third processing system causes the server system to:
    determine, in response to receiving the authentication code, whether the authentication code received from the authenticating user corresponds to the authentication code sent to the initiating user;
    determine, when the authentication code received from the authenticating user corresponds to the authentication code sent to the initiating user, whether a usage limitation of the authentication code has been reached;
    when no usage limitation of the authentication code has been reached, send a second confirmation word related to the first confirmation word to the authenticating user;
  wherein if the authenticating user receives the second confirmation word from the server system, the authenticating user provides the second confirmation word to the initiating user via the communication session,
  wherein if the authenticating user does not receive the second confirmation word from the server system, the authenticating user refuses to perform an action requested by the initiating user.

* * * * *

UNITED STATES PATENT AND TRADEMARK OFFICE
CERTIFICATE OF CORRECTION

PATENT NO. : 8,468,584 B1
APPLICATION NO. : 13/079656
DATED : June 18, 2013
INVENTOR(S) : Hansen Page 1 of 1

It is certified that error appears in the above-identified patent and that said Letters Patent is hereby corrected as shown below:

In the Claims

Col. 21, line 67, claim 11: "correspond the previously-generated" should read --correspond to the previously-generated--

Signed and Sealed this
Twenty-fifth Day of March, 2014

Michelle K. Lee
*Deputy Director of the United States Patent and Trademark Office*